US005542734A

United States Patent [19]
Burchett et al.

[11] Patent Number: 5,542,734
[45] Date of Patent: Aug. 6, 1996

[54] COVER ASSEMBLY FOR COAL CARRYING VEHICLES

[75] Inventors: Darvin Burchett; Allen L. Hubbard, both of Prestonburg, Ky.

[73] Assignee: Truck Covers, Inc., Indiantown, Fla.

[21] Appl. No.: 192,406

[22] Filed: Feb. 4, 1994

[51] Int. Cl.⁶ .................................................. B60P 7/02
[52] U.S. Cl. ........................... 296/100; 105/377.06
[58] Field of Search ................. 296/100; 105/377.01, 105/377.05, 377.06

[56] References Cited

U.S. PATENT DOCUMENTS

| | | | |
|---|---|---|---|
| 1,333,464 | 3/1920 | Christophersen | 105/377.06 |
| 2,886,375 | 5/1959 | Crawford | 296/100 |
| 4,181,351 | 1/1980 | Spanke | 296/100 |
| 4,542,931 | 9/1985 | Walker, Jr. | 296/100 |
| 4,585,267 | 4/1986 | Friesen | 296/100 |
| 4,625,654 | 12/1986 | Kuss et al. | 105/377 |
| 4,627,658 | 12/1986 | Vold et al. | 296/100 |
| 4,629,243 | 12/1986 | Jensen | 296/100 |
| 4,673,208 | 6/1987 | Tsukamoto | 296/98 |
| 4,673,209 | 6/1987 | Rafi-Zadeh | 296/100 |
| 4,819,981 | 4/1989 | Moe et al. | 296/100 |
| 4,823,394 | 5/1989 | Macomber | 296/100 |
| 4,858,984 | 8/1989 | Weaver | 296/100 |
| 5,403,061 | 4/1995 | Micknowicz | 296/100 |

*Primary Examiner*—Joseph D. Pape
*Attorney, Agent, or Firm*—Howard & Howard

[57] ABSTRACT

A cover assembly for vehicles, such as coal trucks, hopper cars and the like. The assembly includes a rigid cover which is mounted to the body of the vehicle by an easily engagable hinge assembly to provide a cover which can be selectively hinged to either side of the vehicle to provide a movable roof. The roof can be opened to either side of the vehicle so as to expose the coal and permit the same to be sampled or removed by an auger or other suitable mechanisms through the top of the coal carrier.

10 Claims, 3 Drawing Sheets

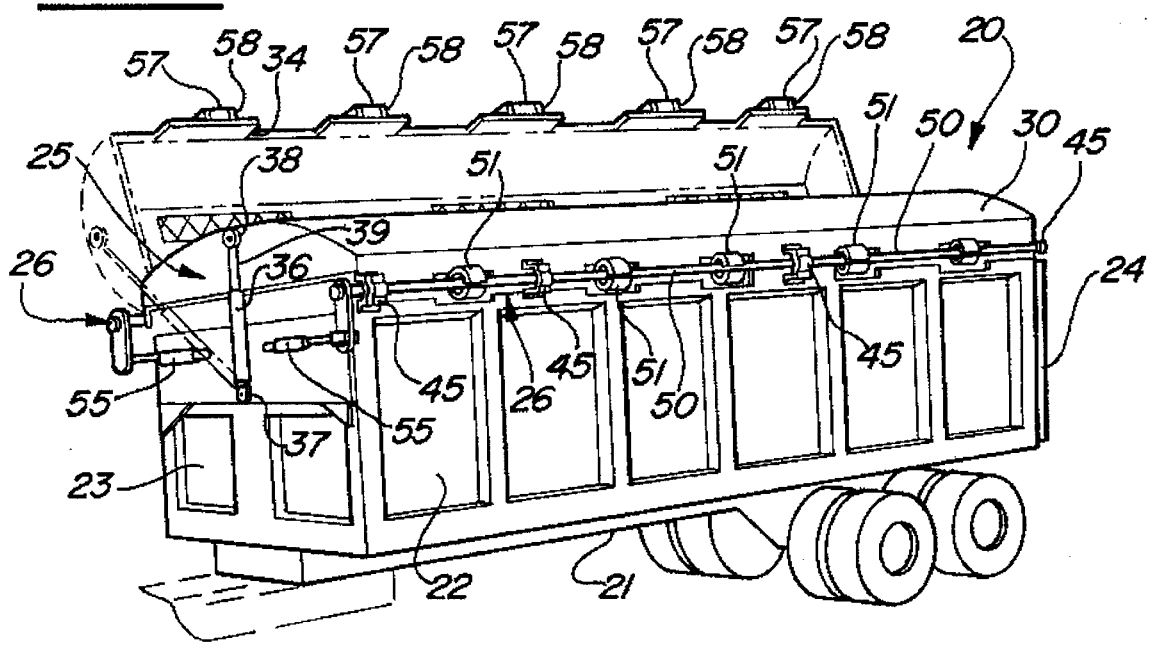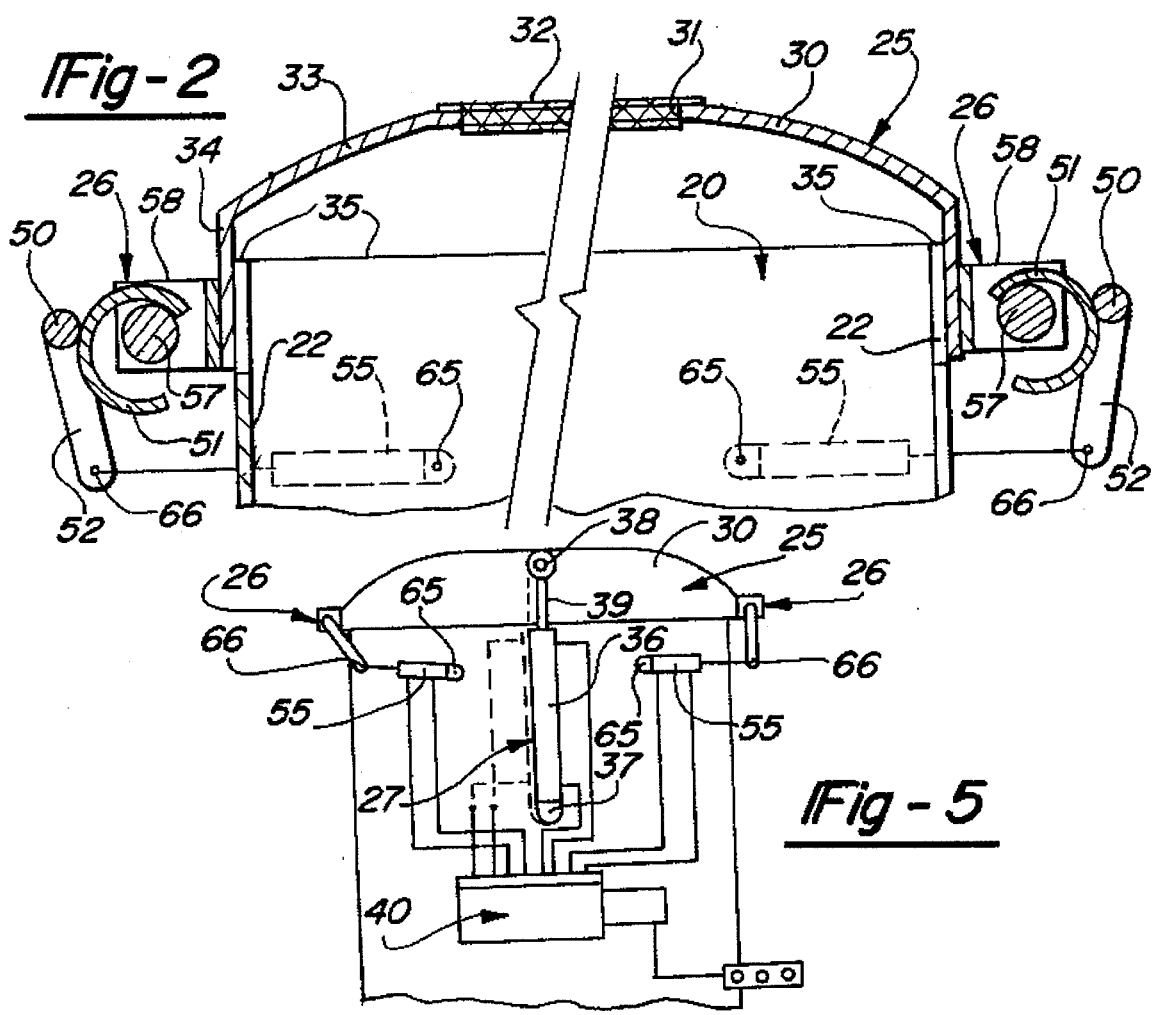

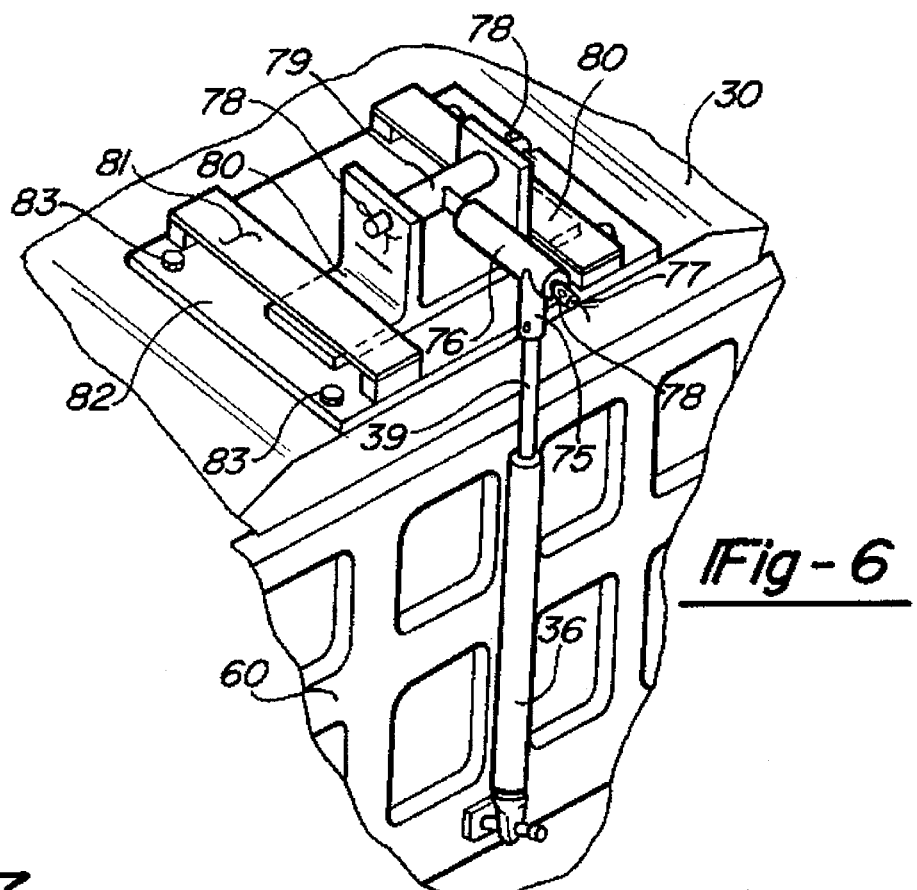
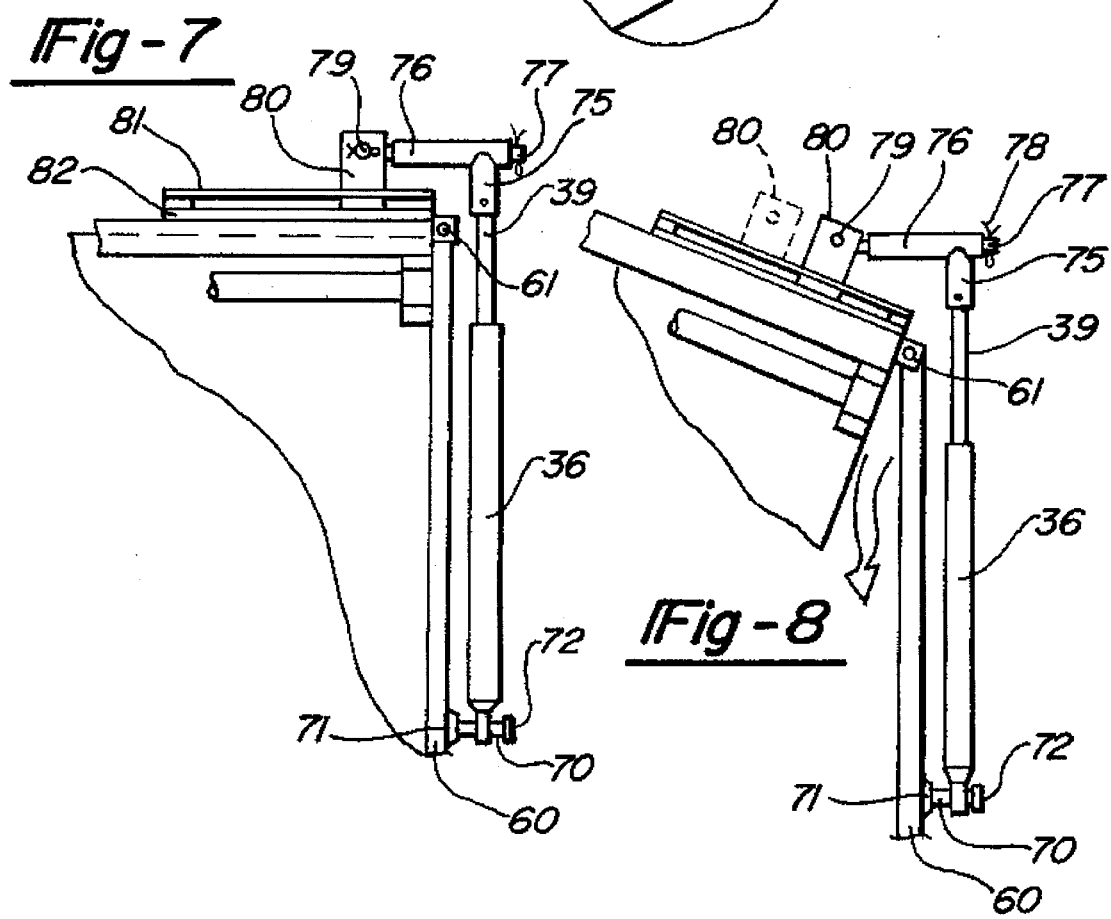

5,542,734

COVER ASSEMBLY FOR COAL CARRYING VEHICLES

BACKGROUND OF THE INVENTION

1. Field of the Invention

This invention relates in general to covers for coal carrying vehicles, and more particularly, to a coal carrying vehicle having a cover which can be selectively hinged to either side thereof, so as to provide a movable roof which can be opened to either side of the vehicle to expose the coal or other load being carried therein.

2. Description of the Prior Art

The problem of how to provide satisfactory covers for open-top vehicles intended to carry coal, or other materials which can spill or be blown from the open top of the vehicle during transit, has been one of longstanding in the art. Typically, the truck or other vehicle in which the material is being carried has an open-topped container bed, which is covered with a tarpaulin, such as a canvas tarpaulin. However, such tarpaulins are not a satisfactory solution to the problem because they are difficult and time consuming to securely fasten to the open top of the bed, and it is just as difficult and time consuming to remove them for unloading.

This is a particular problem with coal carrying trucks, which often must have the loads sampled by an auger or other sampling device before the truck is permitted to unload, often at some distance from the sampling operation. The operator of the vehicle must either leave the tarpaulin off after the sampling operation and risk the loss of coal when driving to the unloading area, or lose time in reinstalling the tarpaulin. In addition, due to the height of the truck bed, installing and removing the tarpaulins is a somewhat dangerous operation, and the tarpaulin is not particularly durable.

In view of the foregoing, the art has attempted many solutions to the problem of providing satisfactory covers for vehicles having open-top bodies. However, many of these efforts have been limited to small trucks and have involved mechanisms, such as a spring-loaded mechanism, which would not be appropriate to large trucks where the liftable cover is relatively heavy; and many of the solutions provide relatively little distance between the top of the bed of the truck and the underside of the cover when the cover is in the raised position, all of which severely limit the utility of the vehicle in terms of loading and unloading. For large coal or gravel-carrying vehicles, in order to make a practical cover means, the cover must be capable of being quickly and easily operated with simple-to-operate mechanisms, a lifting means must be provided which assures that the cover is lifted in a predictable manner, and the cover must be operable in a manner to ensure that loading or unloading will be easy using conventional equipment.

SUMMARY OF THE INVENTION

In order to solve the above-described longstanding problems in the prior art, a new and improved cover for vehicles having open-topped bodies having bottom walls, side walls and front and rear end walls is provided. A cover means having a lower perimeter portion cooperating with the upper perimeter of the vehicle body is provided to cover said open-top vehicle body. A lifting means is provided for the cover, and engagable hinge means for selectively engaging one side or the other side of the cover are provided, such that the cover may be quickly and easily opened to one side or the other of the vehicle body.

Accordingly, it is an object of the present invention, to provide a new and improved cover assembly for use on the bed of an provide a new and improved open-top truck body or other vehicle.

Another object of the present invention is to provide a new and improved cover assembly of the foregoing nature, which can be quickly and easily hinged to either side of the vehicle body, so as to expose the load in the vehicle and permit the same to be easily removed or sampled.

Another object of the present invention is to provide fluid pressure operated means for performing the hinging operation, using engagable hinge means.

A still further object of the present invention is to provide a new and improved cover assembly for use in open-top vehicles, whereby said cover assembly may be quickly and easily operated by the vehicle operator from a remote location, such as the vehicle cab.

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 1 is a perspective view showing an open-top truck body on which a construction embodying the present invention has been installed.

FIG. 2 is a partial sectional view of the construction shown in FIG. 1, and showing the engagable hinge means of the present invention in their closed position.

FIG. 5 is a diagrammatic view showing the connection of a fluid pressure supply system to the lifting means and the engagable hinge means of the present invention.

FIG. 6 is a fragmentary perspective view of the rear end of a truck body embodying a modification of the present invention, wherein a hinged rear tailgate is provided to allow for the emptying of the load from the truck body, and the rear lifting means is mounted by way of a slidable hinge assembly to the top of the cover.

FIG. 7 is an elevational view of the assembly shown in FIG. 6.

FIG. 8 is a view similar in large part to FIG. 7, and shows how the hinge assembly of FIG. 6 slides when the truck body is tipped to unload.

Figure 3:
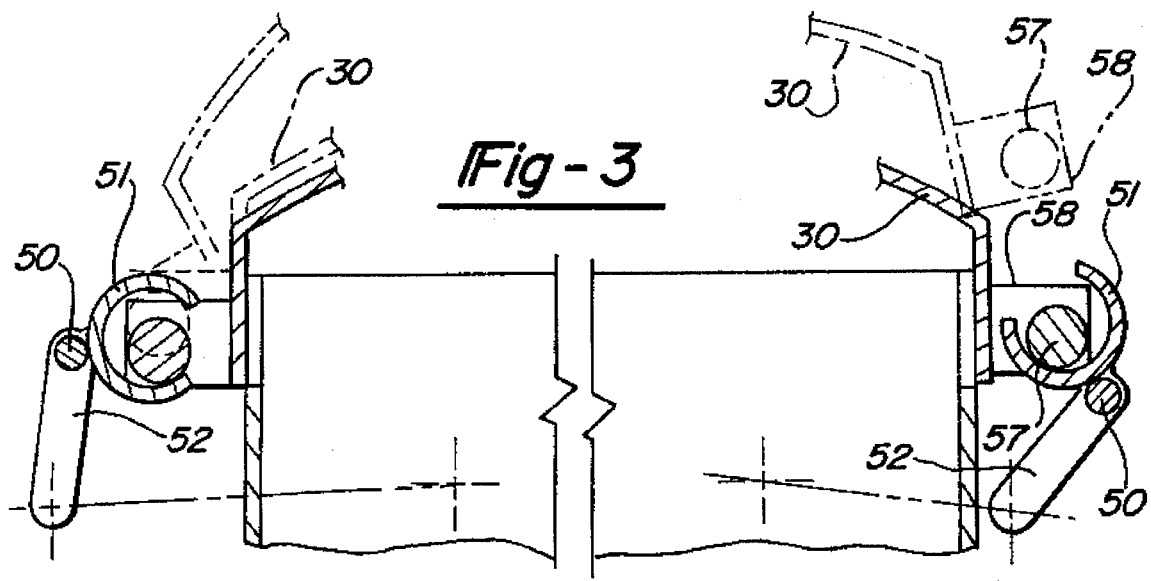
FIG. 3 is a view similar in part to FIG. 2, but showing one of the engagable hinge means in its open position, allowing for pivoting of the cover means of the present invention by the lifting means.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENTS

Referring now to FIGS. 1 and 2, there is shown an open-top truck body generally designated by the number 20, having a truck body bottom 21, side walls 22, front end wall 23, and rear end wall 24. A cover means, generally designated by the numeral 25, is selectively connectable to one side wall or the other 22 of the open-top truck body 20 by means of the engagable hinge means, generally designated by the numeral 26.

A lifting means, generally designated by the numeral 27, in conjunction with the operation of the engagable hinge means 26, will cause the cover means 25 to open to one side or the other of the open-top truck body 20.

More particularly, the cover means, generally designated by the numeral 25, includes a cover member 30, preferably made of aluminum, having one or more openings 31, closed by screens 32. The cover 30 has a rounded upper portion 33 and a perimeter portion 34, which may either rest on top of, or surround, the truck body top perimeter 35, which is formed as indicated by the top edges of the side walls 22, the front wall 23, and the rear wall 24 of the open-top truck body 20. It should be understood that the cover means 25 has been shown on an open-top truck body 20 for the purposes of illustration only. It is contemplated that my invention may be used on any type of open-top vehicle, such as railroad hopper cars, gravel trucks and the like.

A lifting means 27 is provided for the cover means 25 by virtue of pivotally mounting a pair of first fluid pressure activated cylinders 36, each of which are pivotally mounted by first pivot pin 37 to the front or rear wall of the truck body 20 at one of its ends, and by second pivot pin 38 to the cover 30. It can be seen that the rod end 39 of the cylinder 36 may be reversed, if desired, and that either end of the cylinder may be connected to the cover 30. The cylinders 36 are connected by means well known in the art to activating means 40 for said lifting means 27. The activating means 40 include fluid pressure means for supplying fluid pressure to each of said cylinders to cause them to expand and cause said cover means to rotate about said engagable hinge means 26.

Figure 4:
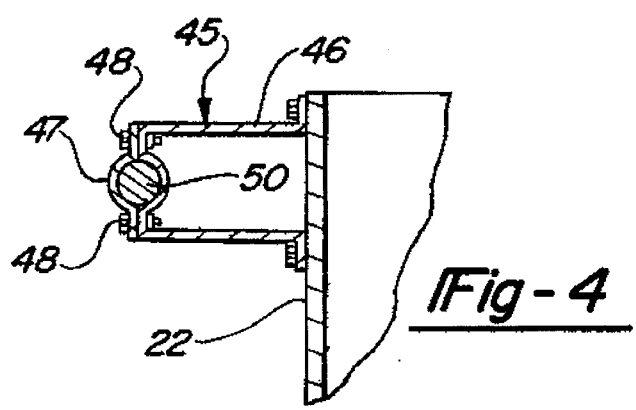
FIG. 4 is a fragmentary, sectional, view of a construction embodying the present invention, showing a split bearing in which the shaft means is journaled for rotation.

Referring now to FIGS. 2–5, the operation of said engagable hinge means can be seen. A plurality of bearing supports 45 having base portions 46 and cover portions 47 are mounted in axial alignment to the top of side walls 22 of the open-top truck body 20. A shaft 50 is journaled for rotation on each side of the truck body 20 by means of being held in place between base portion 46 and cover portion 47 of bearing support 45 by fastening means, such as the bolt and nut assemblies 48. Mounted to each shaft 50 are a first plurality of cradles 51, which are rotatable between a closed position shown in FIG. 2, and an open position, as shown on the right-hand side of FIG. 3. The cradles are moved from their closed position to their open position by means of links 52 fixedly attached to the shaft 50, and connected to means to rotate said shaft mounted to said truck body 24 in the form of second fluid pressure operated cylinders 55, which, as in the case of the first pressure activated fluid cylinder, is pivotally mounted at one of its ends to the front wall 23 of the truck body 24 by pivot pin 65, and at its rod end to the lower end of the link 52 by pivot pin 66. The second fluid pressure operated cylinders are connected by means well known in the art to a fluid pressure means to supply fluid pressure to each of said cylinders. Means to selectively direct fluid to one or the other of said cylinders, which are well known in the art, are also provided. The fluid pressure means for the second fluid pressure actuated cylinders 55 may be the same as that for the first fluid pressure operated cylinders, and may be contained within the activating means 40. Activating means 40 may be of a pneumatic, hydraulic, or other type.

The cradles 51 loosely, and partially, encircle lug means 57 mounted to brackets 58, which are, in turn, mounted to the lower perimeter portion 34 of the cover 30 in a spaced, axially aligned relationship with said bearing supports 45 when said cover is closed.

When the shaft 50 is in its first, or closed, position shown in FIG. 2, the cradles 51 engage the tops of both sets of lugs 57, and lock the cover 30 in position. When the right hand shaft 50 is rotated to its second, or open, position by virtue of the retraction of the associated second pressure operated cylinder 55, the cradle 51 rotates clockwise along with the shaft 50, and uncovers the right-hand lug means 57 so that, upon actuating the lifting means, the cover will lift slightly, and then open to the left as shown in the phantom lines.

The positioning and dimensioning of the cradles 51 will depend on the particular application to which my invention is being applied. If the cover 30 has a perimeter portion 34 which encircles the truck body top perimeter 35, there should be sufficient clearance between the lugs 57 and the cradle 51 so that the entire top 30 may lift sufficiently to clear or almost clear the truck body top perimeter 35 before it starts rotating about the lug means 57. Of course, if the cover 30 rests on the truck body top perimeter instead of surrounding it, this will not be a problem and the dimensions of the cradles 51 can be different.

Referring now to FIGS. 6–8, there is shown a modification of the present invention where the open-top truck body 20 has a tailgate 60 hingedly mounted thereto by means of the hinge 61. Since the cargo tailgate 60 will attempt to open and allow discharge of the load when the truck body 20 is tilted, the embodiment of my invention previously described wherein the lifting means 27 were mounted to stationary front end walls 23 and rear end walls 24 of the truck body 20 will not operate properly because the lifting means 27 mounted on the rear end wall 24 of the truck would be destroyed or severely deformed the first time the tailgate 60 opened.

To solve the problem presented, one of the first fluid pressure activated cylinders 36 is still used on the rear of the truck body 20, but the lower end thereof is mounted to tailgate 60 by means of the pivot pin 70 being butt welded to the plate 71, which, in turn, is fastened to the tailgate 60 by means well known in the art. The pivot pin 70 has an enlarged portion 72 to retain the first fluid pressure activated cylinder 36 thereon. While this is similar to the mounting previously described, the rod end 39 of the cylinder 36 is mounted to the rear of the cover 30 by a slidable hinge assembly. In this modification of the present invention, rod end 39 is attached to adapter 75, which forms a portion of the rotatable collar 76, which encircles and rotates on shaft 77. Collar 76 is retained on shaft 77 by a retaining means, such as a cotter pin 78. Other retaining means serving similar retaining purposes are well known in the art and may also be used. Shaft 77, in turn, is butt welded or otherwise attached to second shaft 79, which is mounted for rotation to bifurcated bracket 80 and is retained therein by similar cotter pins or retaining means 78.

The bifurcated bracket 80 is slidably retained by the retaining members 81 mounted to the plate 82, which is fastened to the cover 30 by way of the bolts 83. The adapter 75, together with the rotatable collar 76, shaft 77, retaining means 78, second shaft 79, bifurcated bracket 80, retaining members 81 and the plate 82, taken together form a slidable shaft means.

When the truck body 20 is in its lowered position, such as shown in FIG. 7, the first fluid pressure activated cylinder 36 is parallel to the tailgate 60, much as it would be in the embodiment of the present invention shown in FIG. 1. However, when the truck body 20 is tilted as shown in FIG. 8, and the tailgate 60 opens to discharge the load, the first pressure activated cylinder 36 is able to remain parallel to the tailgate 60 by virtue of the second shaft 79 pivoting in the bifurcated bracket 80 in the first stage of tilting and then, if necessary, the bifurcated bracket 80 sliding under the retaining members 81 to the position shown in dotted lines.

Referring again to FIGS. 6 and 7, when the truck body 20 is in its lowered position, and it is desired to tilt the cover, this embodiment of the present invention works much like the embodiment previously described, with the first pressure activated cylinder 36 extending the rod end thereof 39 to lift and tilt the cover which, in this modification of the invention, is permitted by the collar 76 rotating about the first shaft 78. In this manner, a modification of the present invention is provided which allows for unloading the contents of the truck body 20 through the rear thereof.

Thus, by giving careful consideration to the many longstanding problems in the art associated with providing covers for open-topped vehicles, I have provided a novel cover assembly for such vehicles.

We claim:

1. A hinged cover for an open-top body having a body bottom wall, side walls, and front and rear-end walls, the uppermost portions of the said walls forming a body top perimeter, said cover including, in combination:
   a) a cover means having a lower perimeter portion cooperating with said body top perimeter portion to cover said body;
   b) a lifting means for lifting said cover means when desired said lifting means including a pair of first fluid pressure actuated cylinders, each pivotally connected at one of its ends to said body and at its other end to said cover means;
   c) engagable hinge means for selectively connecting one side or the other side of said cover means to one or the other of said side walls of said body to cause said cover to open to the right or to the left with respect to said body when said lifting means are activated; and
   d) activating means for said lifting means.

2. The device defined in claim 1, wherein said activating means further include:
   a) fluid pressure means for supplying fluid pressure to each of said first fluid pressure activated cylinders to cause them to expand and cause said cover means to rotate about said hinge means.

3. The device defined in claim 2, wherein said pair of first fluid pressure actuated cylinders are each pivotally connected at one of their ends to said cover means and at their other ends to said front wall and said rear wall of said body.

4. The device defined in claim 1, wherein said engagable hinge means further include:
   a) a shaft means mounted to said body proximate each side of said body top perimeter and journaled for rotation between a first engaging position and a second disengaging position;
   b) a first plurality of cradles fixedly mounted to each of said shaft means for rotation therewith from a first position to a second position;
   c) lug means mounted proximate said lower perimeter portion of said cover means and in position for engagement by said cradles when said shaft means are in said first position, and for disengagement with said cradles when said shaft means is in said second position; and
   d) means to rotate said shaft means mounted to said body.

5. The device defined in claim 4, wherein said means to rotate said shaft means include:
   a) a second fluid pressure actuated cylinder pivotally connected to each of said shaft means at one end thereof, and pivotally connected to said body at the other end thereof; and
   b) means to control said second fluid pressure actuated cylinders.

6. The device defined in claim 5, wherein said means to control include:
   a) fluid pressure means to supply fluid pressure each of said second fluid pressure actuated cylinders; and
   b) means to selectively direct fluid pressure to one or the other of said second fluid pressure actuated cylinders.

7. The device defined in claim 6, wherein ventilating means are provided in said cover means.

8. The device defined in claim 7, wherein each of said shaft means are journaled for rotation in plurality of split bearings.

9. The device defined in claim 1, wherein said cover is a coal truck cover and said open-top body is a truck body having a truck body bottom wall, side walls, and front and rear-end walls, the uppermost portions of the said walls forming a truck body top perimeter.

10. The device defined in claim 1, wherein said body is a railroad car body.

* * * * *